(12) United States Patent
Frey et al.

(10) Patent No.: US 8,778,519 B1
(45) Date of Patent: Jul. 15, 2014

(54) BATTERY PACK EXHAUST NOZZLE

(71) Applicant: Tesla Motors, Inc., Palo Alto, CA (US)

(72) Inventors: Paul Frey, Portola Valley, CA (US); Dustin Grace, San Carlos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/751,053

(22) Filed: Jan. 26, 2013

(51) Int. Cl.
*H01M 2/12* (2006.01)
(52) U.S. Cl.
CPC .......... *H01M 2/1282* (2013.01); *H01M 2/1229* (2013.01)
USPC .......................................................... 429/54
(58) Field of Classification Search
None
See application file for complete search history.

(56) References Cited

U.S. PATENT DOCUMENTS

| | | | |
|---|---|---|---|
| 7,235,327 B2 * | 6/2007 | Kim et al. | 429/56 |
| 2009/0181269 A1 * | 7/2009 | Unoki et al. | 429/13 |
| 2011/0174556 A1 * | 7/2011 | Hermann et al. | 180/65.1 |
| 2012/0164545 A1 * | 6/2012 | van Rensburg et al. | 429/407 |

\* cited by examiner

*Primary Examiner* — Patrick Ryan
*Assistant Examiner* — Jose Colucci Rios
(74) *Attorney, Agent, or Firm* — J. Richard Soderberg

(57) ABSTRACT

A thermal management system is provided that minimizes the effects of thermal runaway within a battery pack. The system includes a sealed battery pack enclosure configured to hold a plurality of batteries and at least one exhaust nozzle assembly. The exhaust nozzle assembly includes an exhaust nozzle that passes and directs the flow of hot gas from within the battery pack to the ambient environment during a thermal runaway event, a nozzle seal mounted within the exhaust nozzle that seals the exhaust nozzle during normal operation of the battery pack, and a nozzle seal mounting nut that holds the nozzle seal within the exhaust nozzle during normal operation and then melts during a thermal runaway event, thereby allowing the nozzle seal to be ejected through the exhaust nozzle during the event.

14 Claims, 13 Drawing Sheets

BATTERY PACK EXHAUST NOZZLE

FIELD OF THE INVENTION

The present invention relates generally to batteries and, more particularly, to means for mitigating the effects and hazards associated with a battery undergoing thermal runaway.

BACKGROUND OF THE INVENTION

Batteries come in a wide variety of types, chemistries and configurations, each of which has its own merits and weaknesses. Among rechargeable batteries, also referred to as secondary batteries, one of the primary disadvantages is their relative instability, often resulting in these cells requiring special handling during fabrication, storage and use. Additionally, some cell chemistries, for example lithium-ion secondary cells, tend to be more prone to thermal runaway than other primary and secondary cell chemistries.

Thermal runaway occurs when the internal reaction rate of a battery increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During the initial stages of a thermal runaway event, the cell undergoing runaway becomes increasingly hot due to the increased reaction rate and the inability of the system to withdraw the heat at a rapid enough rate. As the temperature within the cell increases, so does the pressure. While the safety pressure release vent built into many cells may help to release some of the gas generated by the reaction, eventually the increased temperature in concert with the increased internal cell pressure will lead to the formation of perforations in the cell casing. Once the cell casing is perforated, the elevated internal cell pressure will cause additional hot gas to be directed to this location, further compromising the cell at this and adjoining locations.

While the increase in cell temperature during a thermal runaway event is sufficient to damage materials in proximity to the event and potentially lead to the propagation of the event to adjoining cells, it is not until the hot gas escapes the confines of the cell, and potentially the confines of the battery pack, that the risk to people and property damage is significant. This is because while the event is confined, the gas generated by the event is primarily composed of carbon dioxide and hydrocarbon vapors. As a result, the autoignition temperature (AIT) of combustible materials in proximity to the event is relatively high. However, once this gas exits the confines of the cell/battery pack and comes into contact with the oxygen contained in the ambient atmosphere, the AIT of these same materials will decrease significantly, potentially leading to their spontaneous combustion. It is at this point in the event cycle that extensive collateral property damage is likely to occur and, more importantly, that the risks to vehicle passengers leaving the vehicle, or to first responders attempting to control the event, becomes quite significant.

Accordingly, it is desirable to control the point of egress of the hot gas to the ambient environment. The present invention provides a system and method for achieving this goal, thereby limiting collateral damage and the risk to first responders and others.

SUMMARY OF THE INVENTION

The present invention provides a thermal management system that exhausts the hot gas and effluent generated during a thermal runaway event occurring within the battery pack, thereby minimizing the risk of personal and property damage while reducing the chances of an initial event propagating throughout the pack. In accordance with the invention, the system is comprised of a sealed battery pack enclosure configured to hold a plurality of batteries and an exhaust nozzle assembly. The exhaust nozzle assembly includes an exhaust nozzle that passes and directs the flow of hot gas from within the battery pack to the ambient environment during a thermal runaway event, a nozzle seal mounted within the exhaust nozzle that seals the exhaust nozzle during normal operation of the battery pack, and a nozzle seal mounting nut that holds the nozzle seal within the exhaust nozzle during normal operation and then melts during a thermal runaway event, thereby allowing the nozzle seal to be ejected through the exhaust nozzle during the event. The nozzle seal mounting nut is preferably fabricated from plastic (e.g., nylon, polypropylene, polycarbonate, acrylonitrile butadiene styrene, etc.) with a melting temperature of less than 250° C., and more preferably less than 200° C. An O-ring, for example fabricated from ethylene propylene, may be used to seal the nozzle seal to the exhaust nozzle. The exhaust nozzle preferably has a melting point higher than 1000° C. and is fabricated from either steel or a ceramic material. The exhaust nozzle may be attached to the outer wall of the battery pack enclosure with a nut, or via welding, brazing or bonding. An O-ring, for example fabricated from a fluoroelastomer, a silicone, a fluorosilicone or a perfluoroelastomer, may be used to seal the exhaust nozzle to the outer wall of the battery pack enclosure. A breather valve, for example with a cracking pressure in the range of 0.5 to 1.0 psi, may be integrated into the nozzle seal. The battery pack enclosure may be divided into a plurality of sealed battery compartments where the batteries are divided among the battery compartments and where each battery compartment includes at least one exhaust nozzle assembly.

A further understanding of the nature and advantages of the present invention may be realized by reference to the remaining portions of the specification and the drawings.

DESCRIPTION OF THE SPECIFIC EMBODIMENTS

Figure 1:
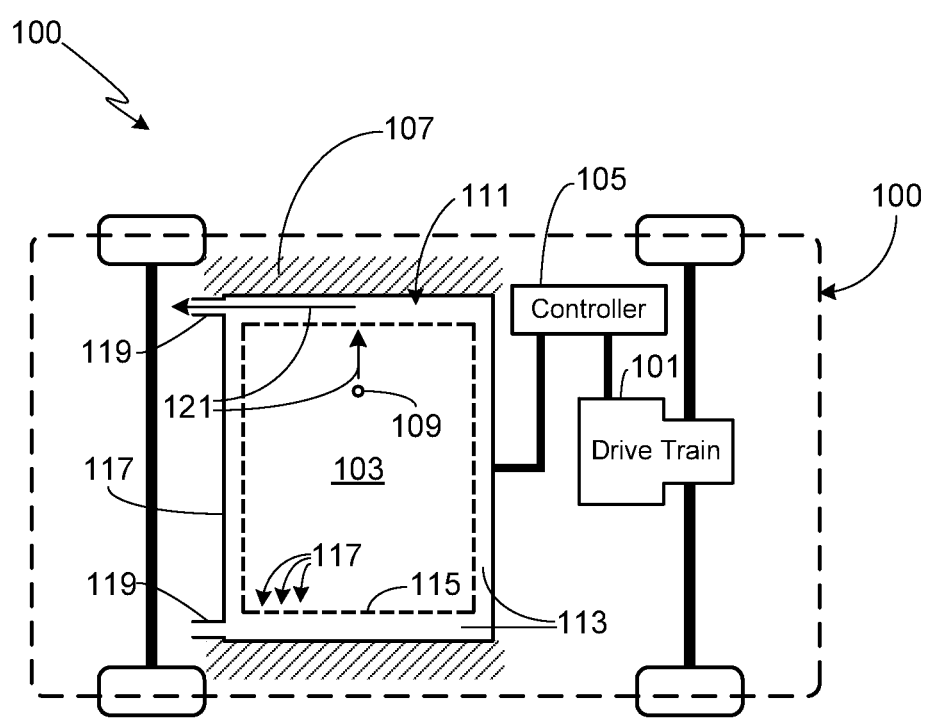
FIG. 1 illustrates the basic elements of a battery pack system designed to control the release of hot gas and material from a thermal event occurring within a portion of the battery pack.

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a non-plug-in hybrid vehicle, also referred to as a HEV, where a hybrid vehicle utilizes multiple propulsion sources one of which is an electric drive system.

When a single battery within a battery pack undergoes thermal runaway, the thermal energy generated by the event can have far-reaching consequences. First, due to the increase in temperature and the related release of hot gas and materials, the temperature of other cells within close proximity to the initially affected cell may increase sufficiently to cause them to enter into a state of thermal runaway which, in turn, may lead to other cells entering into thermal runaway. Therefore the initial thermal event may propagate throughout the battery pack, leading to a much larger thermal event within the pack. Second, as the cell or cells within the pack enter into thermal runaway, the associated increase in pressure may lead to a catastrophic failure of the battery pack enclosure. Unless the battery pack enclosure includes one or more failure points that have been designed to fail at a predetermined pressure, the point of failure will be unknown, resulting in increased risk to passengers, bystanders and first responders depending upon where the random failure point occurs. Third, if the temperature of the gas and material escaping from the battery pack is not lowered prior to its release, the ATI of the combustible materials in proximity to the release point may decrease significantly, potentially leading to their spontaneous combustion. Thus if the egress point is located near a passenger, bystander or first responder, the consequences may be disastrous.

One aspect of overcoming these problems is to control the location or locations where the hot gas and material accompanying a thermal runaway event is released. Another aspect is to control the exchange of thermal energy between regions of the battery pack, thereby helping to prevent a single thermal runaway event from spreading throughout the entire pack and potentially causing catastrophic damage to the vehicle and its surroundings. Co-assigned U.S. Pat. No. 8,268,469, and co-assigned and co-pending U.S. patent application Ser. Nos. 13/475,955 and 13/475,966, both filed 19 May 2012, the disclosures of which are incorporated herein, provide exemplary battery pack configurations.

Figure 2:
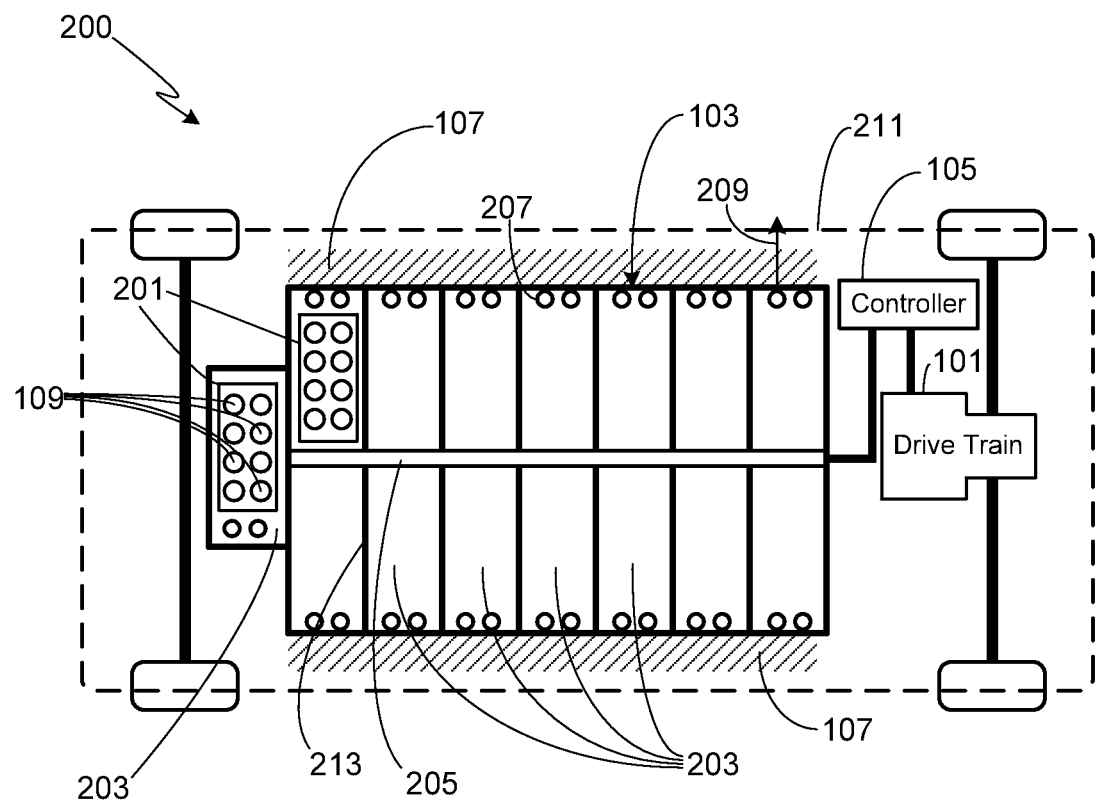
FIG. 2 illustrates an alternate battery pack system designed to control the release of hot gas and material from a thermal event occurring within a portion of the battery pack.

FIGS. 1 and 2 illustrate two prior art battery pack configurations. Although each system is shown implemented in an electric vehicle, i.e., electric vehicles 100 and 200, it should be understood that the nozzle designs described herein may be used with other large battery packs in which a controlled exhaust port is desired (e.g., boats, residential or commercial battery systems, etc.). For illustration purposes, the drive system shown in FIGS. 1 and 2 utilize a single electric motor coupled to the drive axle via a transmission/differential assembly, i.e., drive train 101.

Drive train 101 is coupled to battery pack 103 via a power control module 105, module 105 typically including a DC to AC converter. Power control module 105 insures that the power delivered to the electric motor has the desired voltage, current, waveform, etc. As such, power control module 105 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

Battery pack 103, which is preferably mounted to the vehicle's undercarriage 107, is comprised of a plurality of batteries 109. In FIG. 1 only a single exemplary battery 109 is shown, although clearly the battery pack is designed to be filled, or substantially filled, with batteries. Note that the individual batteries may be housed within modules, such as modules 201 shown in FIG. 2. In FIG. 2 only two modules 201 are shown and only a few individual batteries 109 are shown, although clearly the battery pack is designed to be filled, or substantially filled, with batteries.

The battery pack may be segregated into a plurality of battery pack compartments, e.g., compartments 203 as illustrated in FIG. 2. Note that in FIG. 2 battery pack 103 includes a central battery pack member 205, also referred to herein as a battery pack spine, that separates the left and right compartments as well as providing a convenient means for running power lines, data lines, etc. Battery pack compartments 203 are preferably sealed from one another, both in terms of thermal energy and gaseous exchange, thus helping to prevent a thermal runaway event occurring within one battery pack compartment from propagating to an adjoining compartment. Preferably each battery pack compartment 203 includes only a single module, although in some configurations multiple battery modules may be contained within a single battery pack compartment. Preferably modules 201 are not sealed, but rather designed to 'breathe'.

The number of batteries per module, or per battery pack compartment, or per battery pack, depends upon the needs of the electric vehicle, the energy density of the individual batteries, etc. The use of battery modules as described above simplifies manufacturing and repair as well as providing a convenient approach to electrically interconnecting the batteries and, in some instances, cooling the batteries. It will be appreciated that the number of batteries within each battery pack compartment 203 and the overall size of the battery pack 103 depends on the energy capabilities of the selected batteries as well as the requirements placed on the batteries by the vehicle or other application.

In accordance with the invention, battery pack 103 includes one or more gas exhaust nozzles that are designed to open during a battery thermal runaway event. Each nozzle is sealed, thus preventing contaminants such as road debris and moisture from entering the battery pack during normal operation of the vehicle. As described in detail below, the exhaust nozzle(s) is designed to open during a thermal runaway event in order to provide a controlled exhaust pathway for the hot gas and materials expelled during runaway. Preferably integrated into the exhaust nozzle is a pressure equalization valve that has a cracking pressure much less than the pressure encountered during a thermal runaway event, thus providing a means for handling pressure differentials due to non-thermal events (e.g., due to thermal gradients and changes in atmospheric pressure).

In the battery pack configuration shown in FIG. 1, a portion of the battery pack enclosure includes hollow structural elements that guide the flow of hot gas and material from the thermal event to the exhaust nozzle. In the illustrated embodiment, side members 111 of battery pack 103 are hollow and include at least one cavity 113, also referred to herein as a lumen. The inner walls 115 of side members 111 include a plurality of perforations 117 that allow gas communication between the interior of battery pack 103 and lumen(s) 113.

In vehicle 100, during a battery thermal event the gas and material generated by the event passes through perforations 117 into the cavity or cavities 113 formed within the hollow structural elements 111 of battery pack 103. The gas then flows through cavity or cavities 113 to one or more battery pack gas exhaust nozzles 119, for example by following a pathway 121, at which point the gas then flows out of the battery pack. As described in detail below, exhaust nozzles 119 include an integral seal or an integral seal/breather valve element that remains closed until the occurrence of a thermal event within the battery pack. Preferably nozzle(s) 119 directs the flow of hot gas and material away from the passenger compartment as well as any location where someone could be struck by the escaping gas, thereby minimizing the risks to passengers, bystanders and first responders. In addition, preferably each nozzle 119 directs the flow of hot gas in a direction intended to minimize vehicle damage.

In contrast to utilizing hollow structural elements to guide the effluent from a thermal event to the exhaust nozzle(s), the battery pack configuration shown in FIG. 2 utilizes one or more exhaust nozzles 207 within each battery pack compartment 203. Locating the exhaust nozzles 207 near the edge of each compartment minimizes the length of the exhaust path 209 coupling each exhaust port to the ambient environment falling outside the envelope 211 of the vehicle. Minimizing pathway 209 minimizes the risk of the gas and material expelled during runaway igniting the car which, in turn, lowers the risk to the passengers. Additionally, by including one or more exhaust nozzles 207 within each battery pack compartment 203 and segregating battery pack compartments using internal battery pack walls 213 (also referred to herein as battery pack cross-members) and central battery pack member 205, the risk of overheating the batteries within other battery compartments 203 is minimized.

Figure 3:
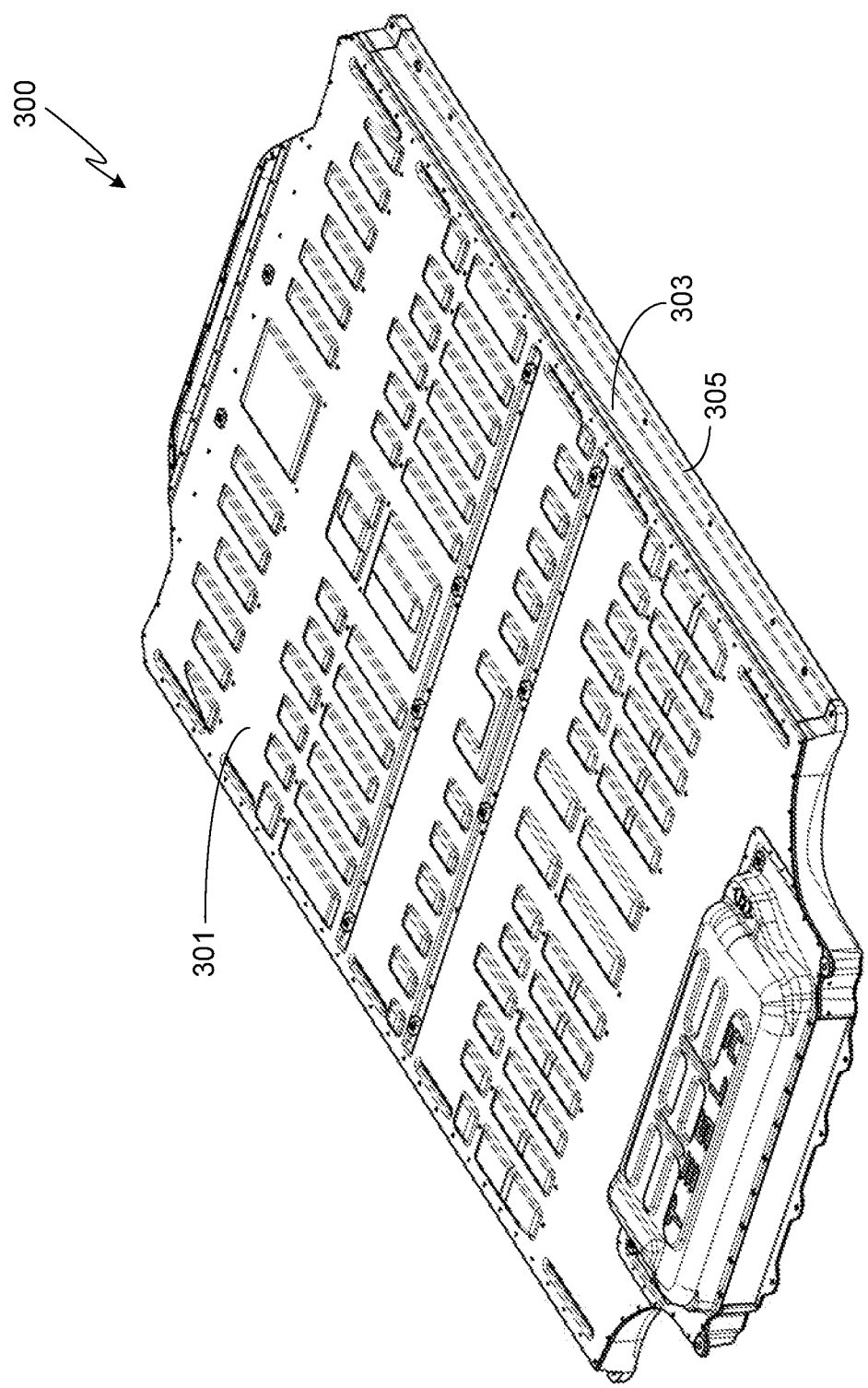
FIG. 3 provides a perspective view of an exemplary battery pack that may use the exhaust nozzle of the present invention.

FIG. 3 provides a perspective view of a battery pack 300 suitable for use with the exhaust nozzle of the invention. In this view, the battery pack is shown closed by a top member 301. Preferably side structural members 303 include an extended region or lip 305 which is used to mechanically and thermally couple the side members 303, and thus the battery pack, to the vehicle structure (not shown).

Figure 4:
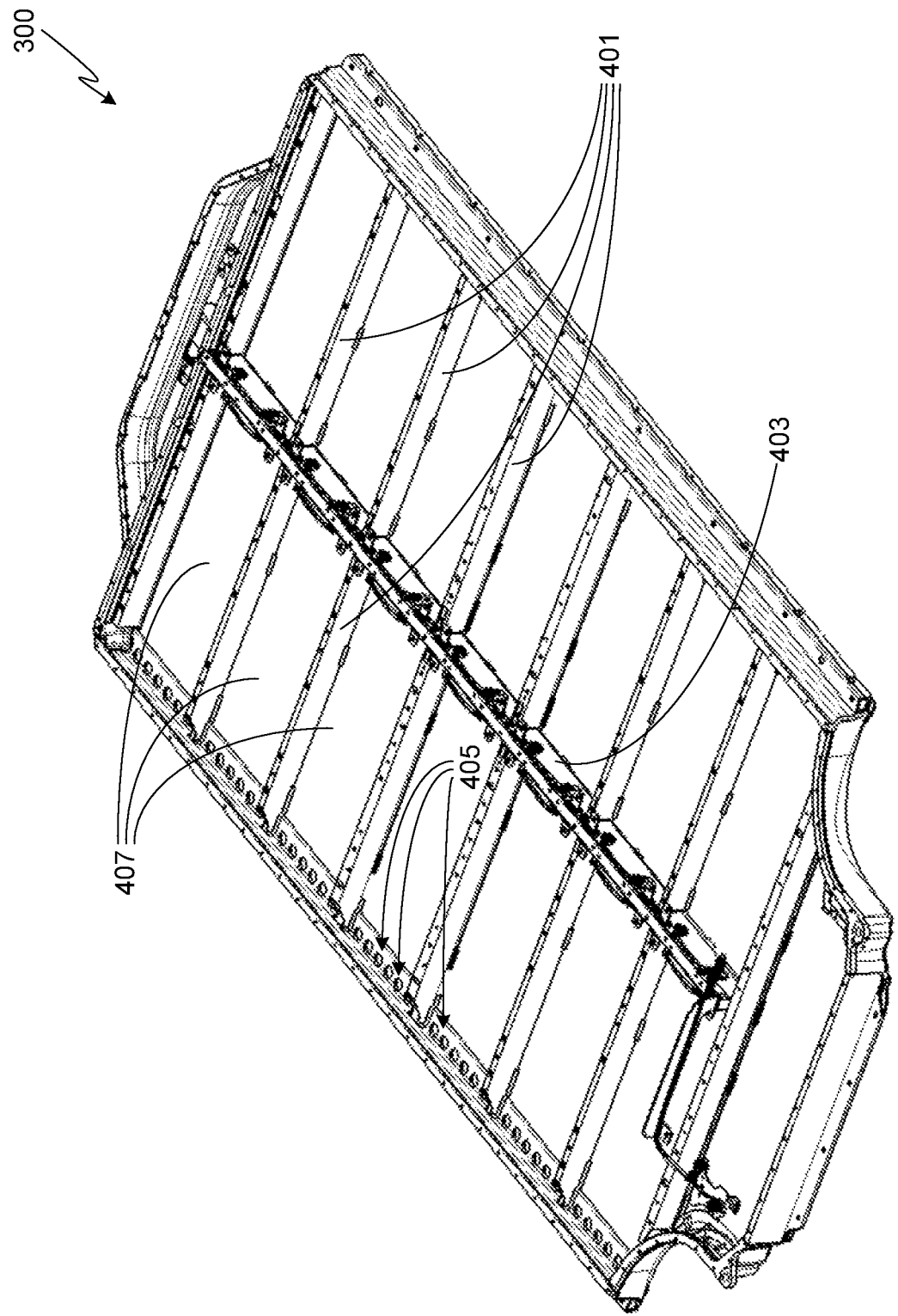
FIG. 4 provides a perspective view of the battery pack shown in FIG. 3, with the top member removed.

FIG. 4 shows battery pack 300 with top member 301 removed. In this view the internal battery pack cross-members 401 are visible as well as the central member 403. Additionally, in this view multiple exhaust nozzles 405 are shown illustrative of the battery pack configuration described above relative to FIG. 2. In this exemplary battery pack, center member 403 and cross-members 401 segregate the battery pack compartments 407 from one another, thereby limiting event propagation by providing a thermal barrier between groups of cells or battery modules as well as significantly limiting, if not altogether eliminating, gas flow between compartments. Members 401 and 403 also add to battery pack strength and stiffness and, assuming that the battery pack is integrated into the vehicle's structure, may be used to improve vehicle performance (e.g., vehicle stiffness, vehicle impact resistance, etc.).

Figure 5:
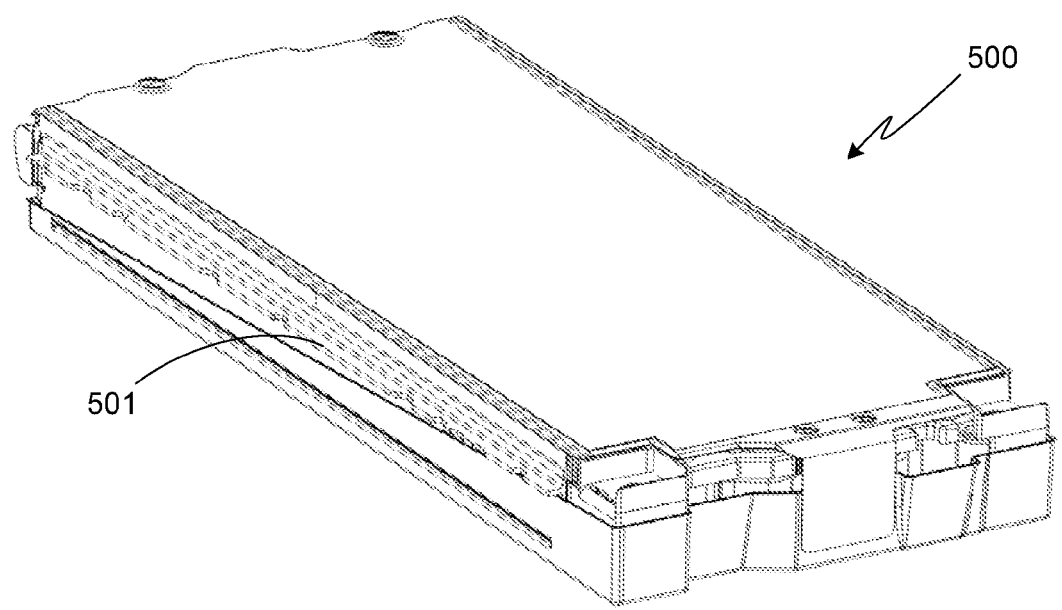
FIG. 5 provides a perspective views of a single battery module for use within a battery pack such as that shown in FIGS. 3 and 4.
Figure 6:
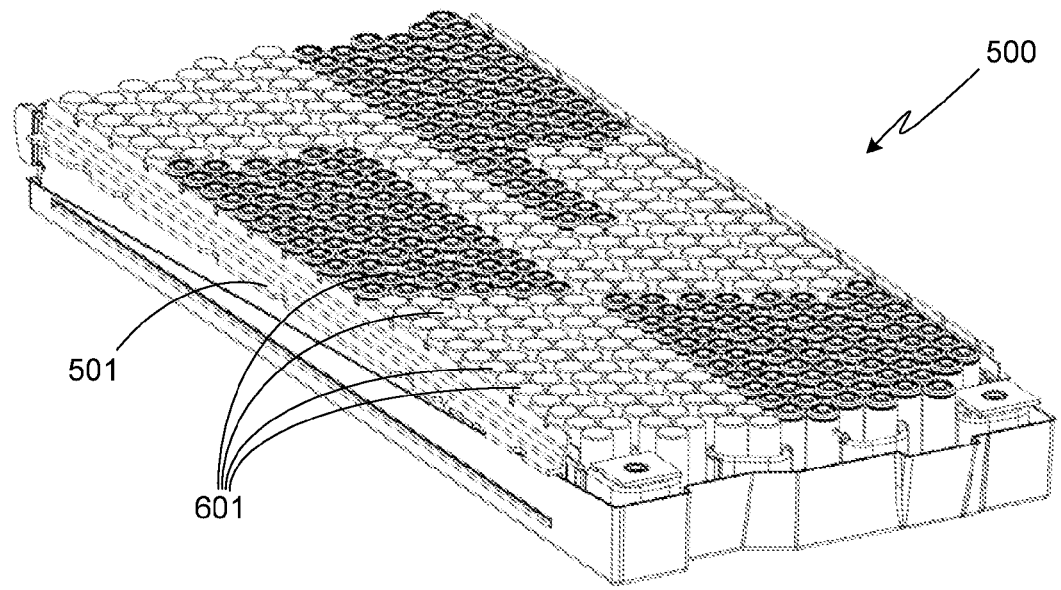
FIG. 6 illustrates the battery module shown in FIG. 5 with the upper module components removed.
Figure 7:
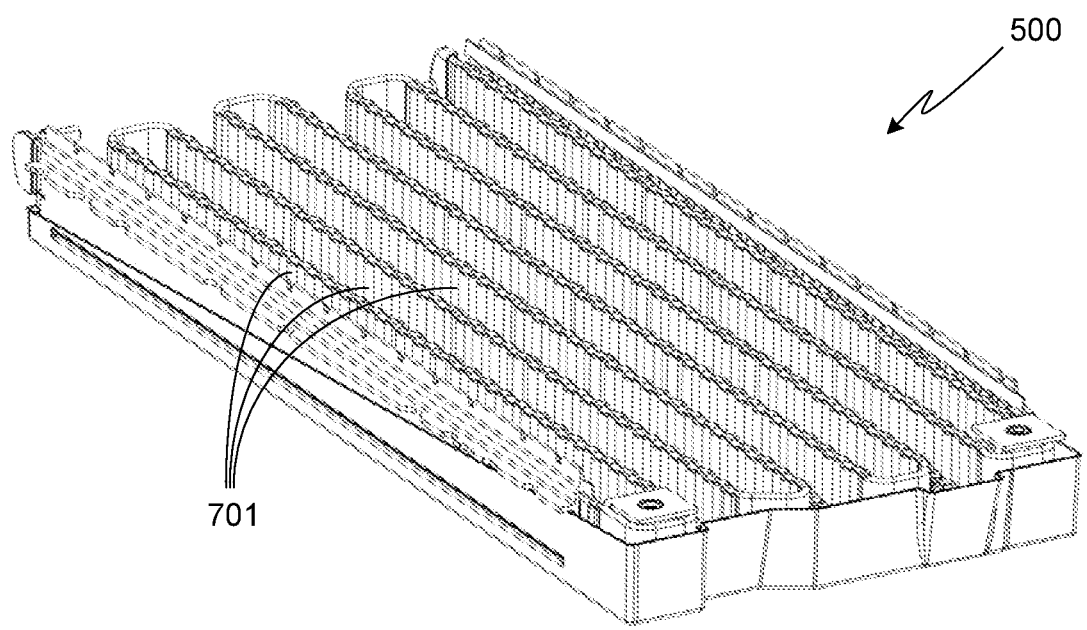
FIG. 7 illustrates the battery module shown in FIGS. 5 and 6 with the batteries removed.

As previously noted, the present invention does not rely on a particular implementation of the battery pack and more specifically, does not rely on a particular implementation of the batteries and battery modules that are contained within the battery pack. Specific implementations are only provided herein to illustrate one preferred configuration. FIG. 5 provides a perspective view of a single battery module 500, this view highlighting the module mounting flange 501. In this configuration, mounting flanges 501 are located on either side of the module and, during battery pack assembly, are captured by the cross-members. FIG. 6 shows a different view of battery module 500 in which the upper portion of the module has been removed as well as several of the upper module components (e.g., cell locator plate, current collector plate, etc.). By removing the upper portion of module 500, the individual batteries 601 within are visible. Note that the orientation of cells 601 within module 500 varies in the illustrated configuration. In the illustrated embodiment, each module 500 contains 370 individual cells, each cell utilizing an 18650 form factor. It should be understood, however, that this only an exemplary configuration and that the invention may be utilize batteries with a different form factor, a larger or smaller number of cells, different cell chemistries, etc. FIG. 7 provides a similar view to that of FIG. 6, with the exception that cells 601 have been removed. With the removal of cells 601, battery cooling conduits 701 are visible, conduits 701 being coupled to the battery pack thermal management system (not shown).

Figure 8:
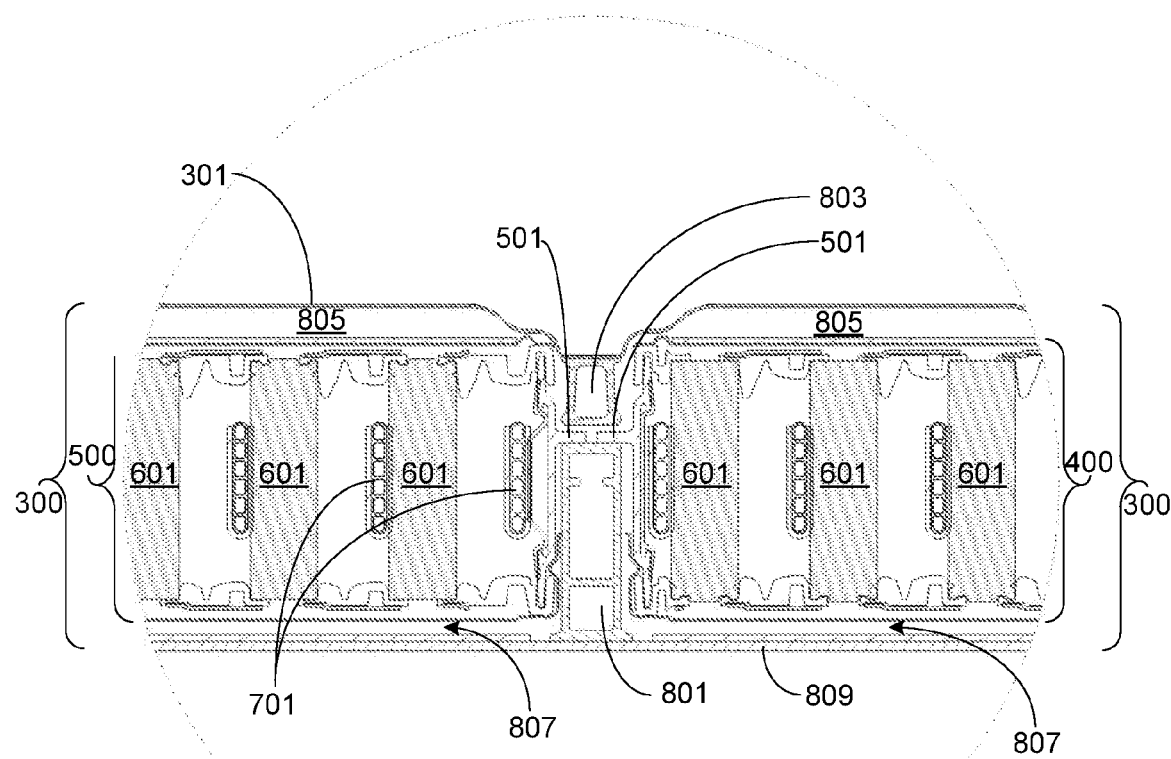
FIG. 8 provides a detailed cross-sectional view of a portion of a battery pack that illustrates gas flow pathways above and below a mounted battery module.

FIG. 8 provides a detailed cross-sectional view of a portion of battery pack 300, this view illustrating the integration and mounting of modules 500 within pack 300. Note that due to the plane used for purposes of this cross-section, and due to the staggering of batteries in this embodiment as illustrated in FIG. 6, the cells mounted to the left side of each cooling conduit 701 are not visible in this figure. In the illustrated configuration, module mounting flanges 501 are shown captured between lower cross-member 801 and an upper cross-member 803, the upper and lower cross-members providing a simple means of locating and holding the module in place within the battery pack. As a result of this mounting configuration, there is an air space 805 between the modules 500 and battery pack top member 301, and a similar air space 807 between modules 500 and battery pack bottom member 809. The air space above and below the modules insure that regardless of the location of a thermal runaway event, there is a clear pathway to an exhaust nozzle (e.g., nozzle 119 in FIG. 1 or nozzle 207 in FIG. 2).

Figure 9:
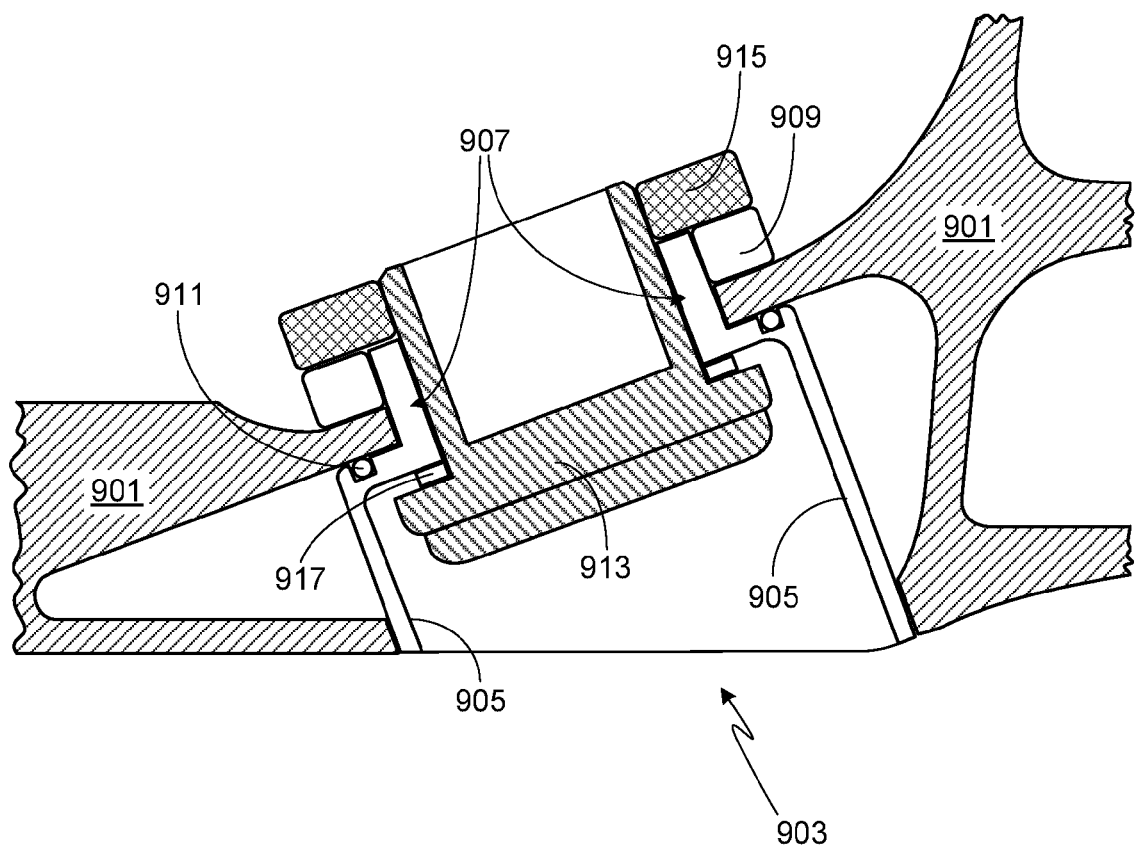
FIG. 9 provides a cross-sectional view of a portion of a battery pack that includes an exhaust nozzle assembly configured in accordance with a preferred embodiment of the invention.

As noted above, regardless of the battery pack configuration, it is desirable to utilize one or more gas exhaust nozzles that seal the battery pack during normal use and then open and direct the flow of hot gas and material in a direction intended to minimize both personal and property damage during the occurrence of a thermal runaway event within the pack. FIG. 9 provides a cross-sectional view of a portion 901 of a battery pack with an exhaust nozzle assembly 903 configured in accordance with a preferred embodiment of the invention.

Exhaust nozzle assembly 903 includes a nozzle 905, preferably cylindrically shaped, that directs the flow of thermal runaway effluent in the desired direction once the seal has opened. Although nozzle 905 may be welded, brazed or bonded in place with a high temperature adhesive, preferably the end portion 907 of nozzle 905 that passes through a hole in the enclosure wall 901 is captured by a nut 909. Preferably nozzle 905 is sealed to enclosure wall 901 with an O-ring 911. O-ring 911 is preferably fabricated from a material with a high temperature resistance such as a fluoroelastomer (e.g., Viton® that is temperature resistant to 200° C.), a silicone or fluorosilicone material (temperature resistant to approximately 230° C.), a perfluoroelastomer (e.g., Chemraz® that is temperature resistant to 320° C.), or Teflon® (temperature resistant to 230° C.). Similarly, nozzle 905 and the means used to capture the nozzle to the battery pack enclosure (e.g., nut 909) are fabricated from a high temperature resistant material(s) such as steel with a melting point of greater than 1400° C., or a ceramic (e.g., alumina, alumina-silica, aluminum oxide, silicon carbide etc.) with a maximum operating temperature of 1000° C. or higher (preferably 1200° C. or higher).

Mounted within an aperture (e.g., hole) within nozzle 905 is the exhaust nozzle sealing member 913, also referred to herein as a seal or nozzle seal. Seal 913 may simply seal closed the aperture within nozzle 905 during normal battery pack/vehicle operation, or may include a breather valve integrated within the sealing member. The breather valve, which may be a one-way or a two-way valve, compensates for pressure differentials, for example due to the vehicle changing altitude or due to outgassing of materials within the battery pack. Typically the breather valve has a cracking pressure in the range of 0.5 to 1.0 psi.

Seal 913 is held within nozzle 905 by means 915, preferably a nut 915. Nut 915 is fabricated from a material that melts or otherwise deforms when the temperature within the battery pack exceeds a predetermined temperature, where the predetermined temperature is greater than the intended and expected operating temperature range of the battery pack. Preferably nut 915 is fabricated from a plastic (e.g., nylon, polypropylene, polycarbonate, acrylonitrile butadiene styrene (ABS), etc.) with a melting temperature in the range of 150° C. to 250° C. An O-ring 917 seals the sealing member 913 to the nozzle 905. O-ring 917 may be fabricated from any material that has a maximum operating temperature greater than the normal operating temperature range of the battery pack, thus insuring that its sealing characteristics are not compromised during normal vehicle operation. In the preferred embodiment O-ring 917 is fabricated from ethylene propylene diene monomer (EPDM), which is temperature resistant to approximately 120° C., and square cut as shown.

During a thermal event, both the pressure and the temperature within the battery pack enclosure increases. Eventually due to the increasing temperature, nut (or other means) 915 melts and/or sufficiently deforms to allow the pressure within the pack enclosure to force sealing member 913 out of nozzle 905. Note that sealing member 913 may also be fabricated from a material (e.g., a plastic) that is designed to melt and deform during a thermal runaway event within the pack. Preferably the inner diameter of the nozzle aperture into which sealing member 913 fits is sufficiently large (e.g., preferably greater than 50 millimeters) in order to minimize back pressure and insure the flow of hot gas out of the battery pack during a thermal runaway event. As nozzle 905 and its mounting assembly (e.g., nut 909) are fabricated from a high temperature material such as steel or ceramic, it remains in place after initiation of the thermal event, thus guiding the hot gas and other effluents resulting from the thermal runaway event in the desired direction, thereby minimizing potential personal and property damage.

Figure 10:
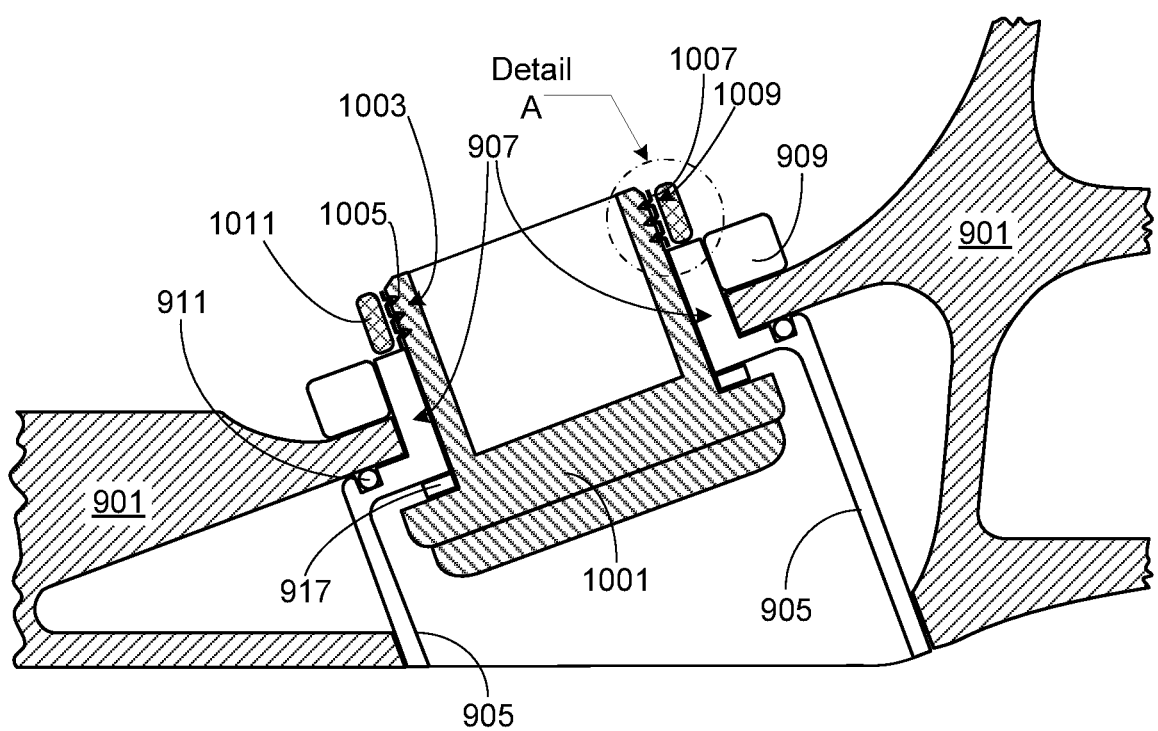
FIG. 10 provides a cross-sectional view of a portion of a battery pack that includes an exhaust nozzle assembly that utilizes an SMA retention member to hold the seal within the exhaust nozzle in accordance with an alternate preferred embodiment of the invention.

FIG. 10 provides a cross-sectional view of an alternate preferred embodiment utilizing a shape memory alloy (SMA) to hold sealing member 1001 within exhaust nozzle 905. SMAs are a relatively well-known class of materials that undergo a phase transformation from a martensite crystalline structure to an austenite crystalline structure when heated to the material's transformation temperature. Although SMAs may be fabricated by alloying various metals (e.g., zinc, copper, gold, aluminum, nickel, titanium, iron, etc.), the most common SMAs are comprised of either a copper-aluminum-nickel alloy, or a nickel-titanium alloy. The latter alloy is commonly referred to as Nitinol.

In accordance with this embodiment, a seal retaining member is fabricated from an SMA and used to capture the seal within exhaust nozzle 905. When the onset of a thermal runaway event is detected the seal retaining member is heated, thereby releasing the sealing member from the nozzle assembly. Preferably the retaining member is actively heated when the thermal event is detected, either using a separate heating element or by joule heating the retaining member itself. If, however, the heater circuit fails, for example due to damage incurred during a vehicle collision, the sealing member will still be released since the heat generated by the thermal event will eventually heat the retaining member to its transformation temperature, thereby passively activating the member.

It will be appreciated that a seal retaining member fabricated from an SMA may utilize any of a variety of shapes to retain the seal within the exhaust nozzle. Accordingly, while two exemplary configurations are shown in FIGS. 10-15, these are not meant to illustrate every possible retaining member configuration.

In the embodiment shown in FIG. 10, the outside surface of the upper portion 1003 of sealing member 1001 includes one or more seal retention features, where the upper portion 1003 is defined as that portion of the sealing member 1001 that extends beyond portion 907 of nozzle 905. Note that portion 1003 is located within the battery pack enclosure. While the seal retention features may utilize any of a variety of shapes, sizes and configurations, preferably these features are formed either as a series of dimples or continuous grooves 1005 that encircle the upper sealing member portion 1003. In this embodiment the SMA retaining member 1007 is formed in the shape of a cylinder, where the cylindrical form is the pre-shaped (i.e., predetermined shape) that the retaining member returns to when heated past the transformation temperature. In this form the retaining member 1007 may be slipped over the end portion 1003 of sealing member 1001.

During the nozzle assembly fabrication process, the sealing member 1001 is first inserted into the nozzle aperture and then the retaining member (also referred to herein as a retaining ring) is positioned over and around the end portion 1003 of sealing member 1001, i.e., retaining ring 1007 is slipped over the end of the sealing member. Next the retaining member is deformed by crimping regions 1009 of the retaining member to match the seal retention features 1005, thereby providing a means of holding seal 1001 in place during normal vehicle operation. Thus assuming that end portion 1003 of sealing member 1001 includes one or more continuous circumferential grooves 1005, crimped regions 1009 take the form of one or more continuous circumferential inwardly directed ridges 1009 that align with grooves 1005 as illustrated.

Figure 11:
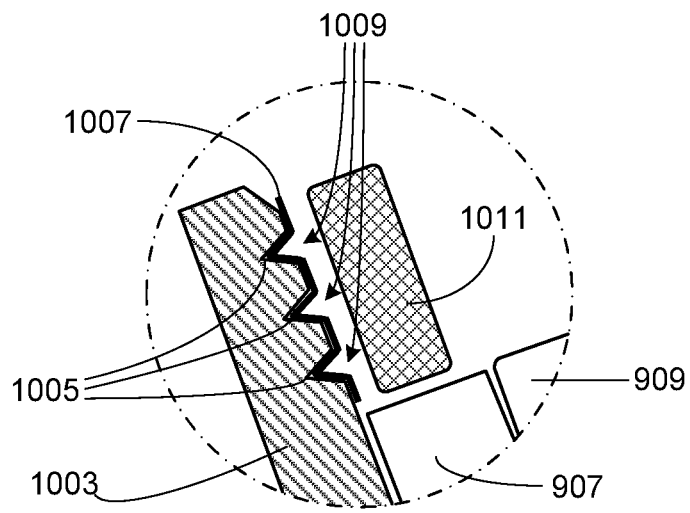
FIG. 11 provides a cross-sectional close-up of detail A of FIG. 10.
Figure 12:
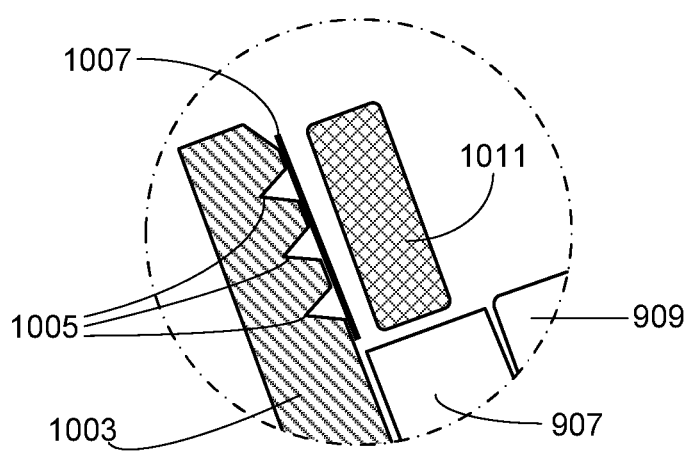
FIG. 12 provides a similar cross-sectional view as that shown in FIG. 11 after the SMA retaining ring has been heated past its transformation temperature.

FIG. 11 provides a cross-sectional close-up of detail A. FIG. 12 provides a similar cross-sectional view as that shown in FIG. 11 after retaining ring 1007 has been heated past its transformation temperature. Once heated, member 1007 returns to its pre-shaped configuration which, in this embodiment, is a ring without deformations 1009. In this form member 1007 no longer holds sealing member 1001 in place, thereby allowing the increased pressure within the pack enclosure during the thermal runaway event to force seal member 1001 out of nozzle 905. As in the prior embodiment, the sealing member may or may not be fabricated from a material that is intended to melt and deform during a thermal runaway event within the pack.

Figure 13:
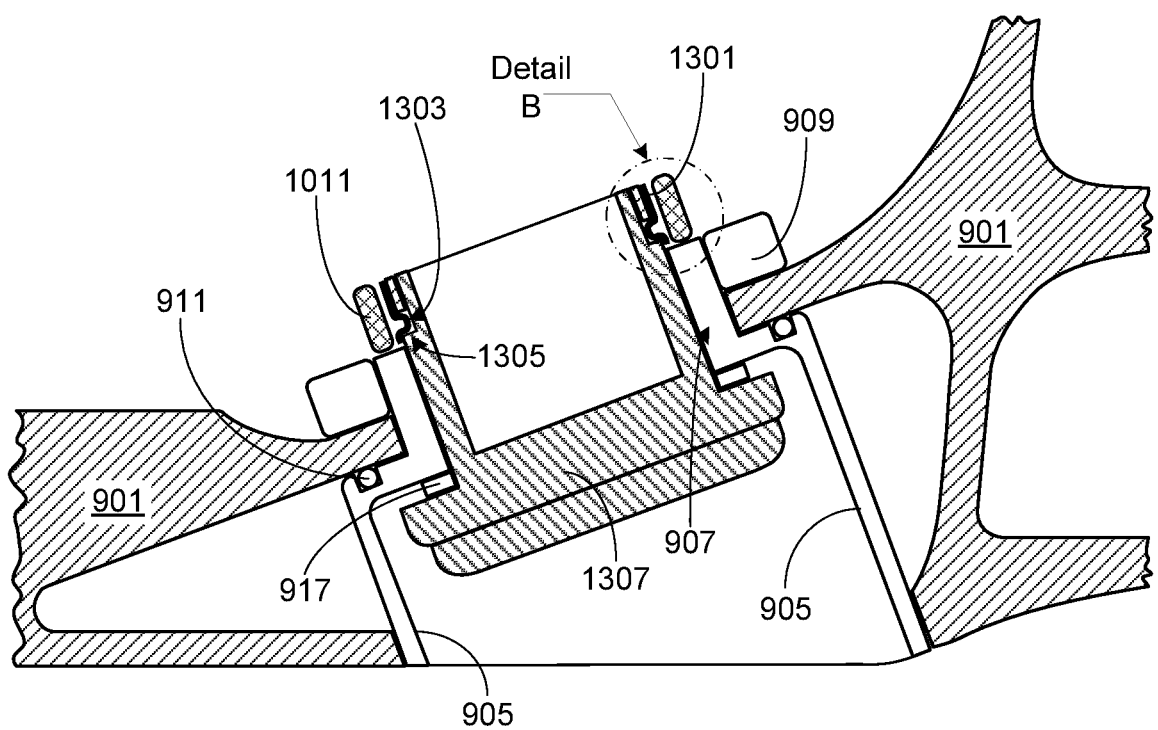
FIG. 13 provides a cross-sectional view of a portion of a battery pack that includes an exhaust nozzle assembly that utilizes an alternate configuration for the SMA retention member that holds the seal within the exhaust nozzle.
Figure 14:
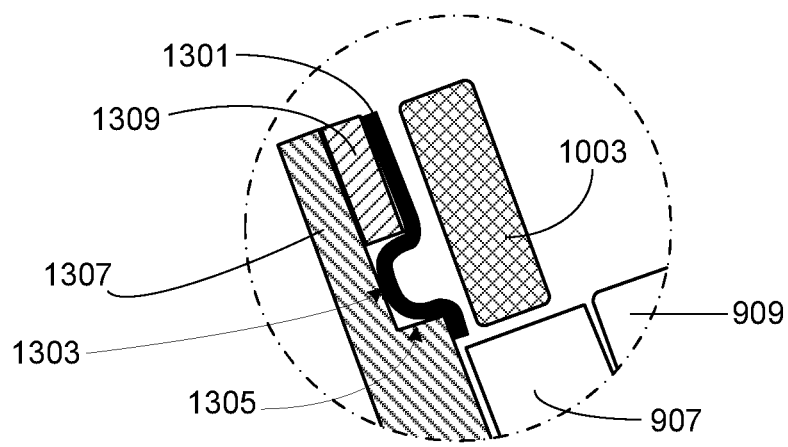
FIG. 14 provides a cross-sectional close-up of detail B of FIG. 13.
Figure 15:
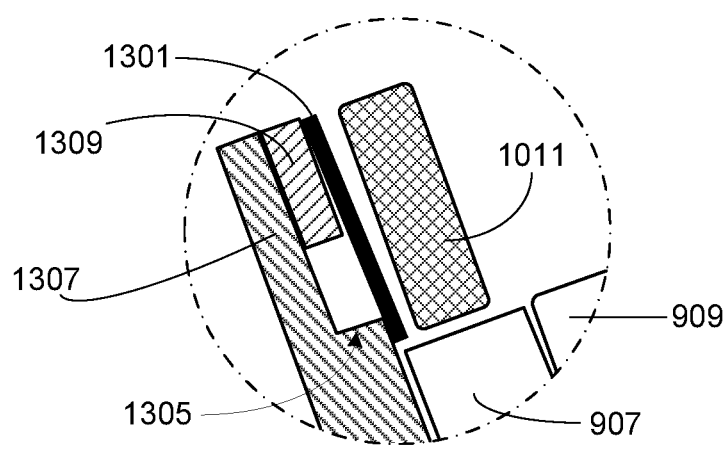
FIG. 15 provides a similar cross-sectional view as that shown in FIG. 14 after the SMA retaining ring has been heated past its transformation temperature.

FIGS. 13-15 illustrate another embodiment utilizing an SMA retention member. Retention member 1301, as in the prior embodiment, is pre-shaped into a cylinder (also referred to herein as ring-shaped). Then, when retention member 1301 is in its martensitic form, it is crimped along its periphery in order to form a ridge 1303 on its inner surface. Preferably ridge 1303 is a continuous, inwardly directed circular ridge on the retaining member's inner surface as shown. Ridge 1303 is captured between lip 1305 of sealing member 1307 and nut 1311. During exhaust nozzle assembly, sealing member 1307 is inserted into the nozzle aperture, crimped retaining member 1301 is slid over the end portion of member 1307, and then nut 1309 is used to lock the assembly together. It will be appreciated that instead of a nut 1309, a ring or other means may be used to lock the assembly together. FIGS. 14 and 15 provide cross-sectional close-up views of detail B before and after the retaining member 1301 is heated past its transformation temperature. As in the prior embodiment, once heated member 1301 returns to its pre-shaped configuration which, in this embodiment, is a ring without ridge 1303. Once member 1301 returns to its ring shape, seal 1307 and nut 1309 are easily ejected from nozzle 905, thus allowing hot gas and thermal runaway effluent to pass out of the battery pack.

Figure 16:
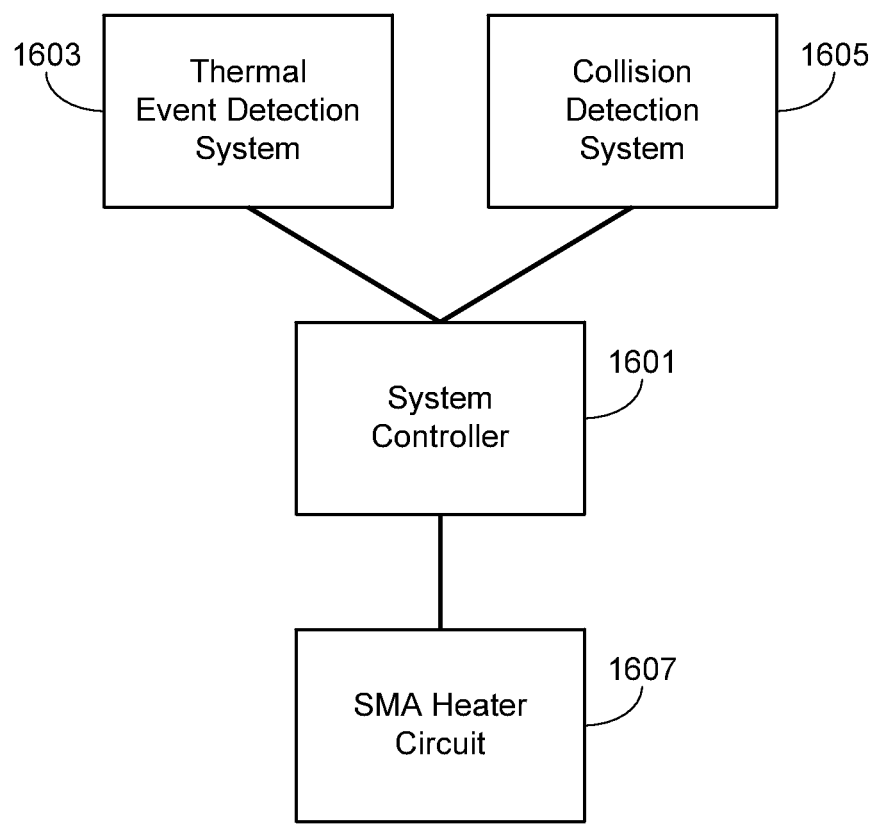
FIG. 16 illustrates a control system for use with an SMA retention member such as those illustrated in FIGS. 10-15.

As noted above, preferably the SMA retaining member is actively triggered at the onset of a thermal event. This aspect of the invention is illustrated in FIG. 16. As shown, a system controller 1601 monitors one or more vehicle subsystems 1603 in order to determine when a thermal runaway event within the battery pack is underway. It will be appreciated that any number of techniques may be used to monitor for thermal runaway. For example, a thermal event detection system may be used that monitors battery pack temperature or some other aspect of the battery pack that is indicative of a thermal runaway event (see, for example, U.S. Pat. Nos. 7,939,192, 8,059,007, 8,092,081, 8,154,256, 8,168,315, and 8,178,227). System controller 1601 may also be coupled to a collision monitoring system 1605, thus allowing the system controller to trigger the SMA retention member if the vehicle is in a collision that may severely damage the battery pack, potentially leading to a thermal runaway event.

Once system controller 1601 determines that the sealing member should be released from exhaust nozzle 905 it activates SMA heater circuit 1607, thereby heating the SMA retention member and causing it to return to its preformed shape. As a result, the sealing member is expelled from the exhaust nozzle by the rising battery pack pressure that accompanies the thermal runaway event. It will be appreciated that SMA heater circuit 1607 may either activate a separate heating element or simply pass sufficient current through the SMA retention member to heat it via Joule heating (also commonly referred to as resistive heating). In the embodiments illustrated in FIGS. 10-15 a separate heating element 1011 is shown located in close proximity to the SMA retention member. Preferably heater 1011 is formed in a ring or collar that surrounds the SMA retention member.

It should be understood that identical element symbols used on multiple figures refer to the same component, or components of equal functionality. Additionally, the accompanying figures are only meant to illustrate, not limit, the scope of the invention and should not be considered to be to scale.

It will be appreciated that while the description and figures provided above describe preferred embodiments, the inventors envision that other configurations may employ the same concepts as a means of controlling the flow of hot gas generated during a thermal event occurring within a battery pack. The specifics of the present configuration are clearly due, at least in part, on the size of the battery pack, the location of the battery pack within the vehicle, and the location of the battery pack relative to the passenger compartment, drive train components, and other vehicle structures. Therefore, depending upon the design of the vehicle or other application for which the battery pack is intended as well as the specifics of the battery pack itself, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack thermal management system, comprising:
   a sealed battery pack enclosure configured to hold a plurality of batteries; and
   an exhaust nozzle assembly, wherein said exhaust nozzle assembly is comprised of:
      an exhaust nozzle made of a high temperature resistant material and mounted in a hole in an outer wall of said sealed battery pack enclosure with an end of the exhaust nozzle that passes through the hole being captured by a nut inside the sealed battery pack enclosure, wherein said exhaust nozzle is configured to pass and direct gas from within said sealed battery pack enclosure to an ambient environment external to said sealed battery pack enclosure;
      a nozzle sealing member mounted within an exhaust nozzle aperture formed by the exhaust nozzle, wherein said nozzle sealing member seals said exhaust nozzle during normal operation of said plurality of batteries within said sealed battery pack enclosure; and
      a nozzle sealing member mounting nut capturing an end of the nozzle sealing member inside the sealed battery pack enclosure, wherein the end of the nozzle sealing member extends further into the sealed battery pack enclosure than the end of the exhaust nozzle, wherein the nozzle seal mounting nut is inward of the nut, wherein said nozzle sealing member mounting nut holds said nozzle sealing member within said exhaust nozzle aperture during normal operation of said plurality of batteries, wherein said nozzle sealing member mounting nut melts when at least one of said plurality of batteries enters into thermal runaway and an internal temperature of said sealed battery pack exceeds a predetermined temperature, and wherein when said nozzle sealing member mounting nut melts said nozzle sealing member is ejected through said exhaust nozzle due to an increasing internal battery pack pressure resulting from said at least one of said plurality of batteries entering into thermal runaway.

2. The battery pack thermal management system of claim 1, said nozzle sealing member mounting nut is fabricated from a plastic with a melting temperature of less than 250° C.

3. The battery pack thermal management system of claim 1, said nozzle sealing member mounting nut is fabricated from a plastic with a melting temperature of less than 200° C.

4. The battery pack thermal management system of claim 1, wherein said nozzle sealing member mounting nut is fabricated from a material selected from the group consisting of nylon, polypropylene, polycarbonate and acrylonitrile butadiene styrene.

5. The battery pack thermal management system of claim 1, wherein said exhaust nozzle assembly further comprises an O-ring, wherein said O-ring seals said nozzle sealing member to said exhaust nozzle.

6. The battery pack thermal management system of claim 5, wherein said O-ring is fabricated from ethylene propylene diene monomer.

7. The battery pack thermal management system of claim 1, wherein said exhaust nozzle is fabricated from a material with a melting point higher than 1000° C.

8. The battery pack thermal management system of claim 7, wherein said exhaust nozzle is fabricated from a steel.

9. The battery pack thermal management system of claim 7, wherein said exhaust nozzle is fabricated from a ceramic material.

10. The battery pack thermal management system of claim 1, wherein said exhaust nozzle assembly further comprises an O-ring, wherein said O-ring seals said exhaust nozzle to said outer wall of said sealed battery pack enclosure.

11. The battery pack thermal management system of claim 10, wherein said O-ring is fabricated from a material selected from the group consisting of fluoroelastomers, silicones, fluorosilicones and perfluoroelastomers.

12. The battery pack thermal management system of claim 1, wherein said exhaust nozzle assembly further comprises a breather valve integrated into said nozzle sealing member.

13. The battery pack thermal management system of claim 12, wherein said breather valve has a cracking pressure in the range of 0.5 to 1.0 psi.

14. The battery pack thermal management system of claim 1, further comprising a plurality of said exhaust nozzle assemblies, wherein said sealed battery pack enclosure is divided into a plurality of sealed battery pack compartments, wherein said plurality of batteries are divided among said plurality of sealed battery pack compartments, and wherein at least one of said plurality of exhaust nozzle assemblies is integrated into each of said plurality of sealed battery pack compartments.

* * * * *